United States Patent
Kang et al.

(10) Patent No.: US 8,402,456 B2
(45) Date of Patent: Mar. 19, 2013

(54) PORTABLE STORAGE DEVICE, SYSTEM AND METHOD FOR AUTOMATIC SOFTWARE INSTALLATION

(75) Inventors: Chun-un Kang, Suwon-si (KR); Chang-nam Chu, Yongin-si (KR); Dae-hyun Lee, Seoul (KR); Seung-hyuk Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1627 days.

(21) Appl. No.: 11/832,129

(22) Filed: Aug. 1, 2007

(65) Prior Publication Data

US 2008/0155529 A1 Jun. 26, 2008

(30) Foreign Application Priority Data

Dec. 22, 2006 (KR) .................. 10-2006-0133084

(51) Int. Cl.
*G06F 9/445* (2006.01)
(52) U.S. Cl. ......... 717/174; 717/176; 717/177; 717/178
(58) Field of Classification Search .................. 717/174, 717/176, 177, 178
See application file for complete search history.

(56) References Cited

U.S. PATENT DOCUMENTS

| | | | | |
|---|---|---|---|---|
| 5,931,909 A | * | 8/1999 | Taylor | 709/221 |
| 6,167,567 A | * | 12/2000 | Chiles et al. | 717/173 |
| 6,954,930 B2 | * | 10/2005 | Drake et al. | 717/178 |
| 7,908,401 B2 | * | 3/2011 | Chang | 709/250 |
| 2002/0083228 A1 | * | 6/2002 | Chiloyan et al. | 710/9 |
| 2002/0147795 A1 | * | 10/2002 | Cantwell | 709/220 |
| 2002/0188941 A1 | * | 12/2002 | Cicciarelli et al. | 717/175 |
| 2003/0037327 A1 | * | 2/2003 | Cicciarelli et al. | 717/178 |
| 2003/0159137 A1 | * | 8/2003 | Drake et al. | 717/172 |
| 2004/0060044 A1 | * | 3/2004 | Das et al. | 717/171 |
| 2004/0125782 A1 | * | 7/2004 | Chang | 370/338 |
| 2005/0028172 A1 | * | 2/2005 | Yoshikawa et al. | 719/321 |
| 2005/0120106 A1 | * | 6/2005 | Albertao | 709/223 |
| 2005/0132349 A1 | * | 6/2005 | Roberts et al. | 717/168 |
| 2005/0144528 A1 | * | 6/2005 | Bucher et al. | 714/38 |

FOREIGN PATENT DOCUMENTS

| | | |
|---|---|---|
| JP | 2000-10905 | 1/2000 |
| KR | 2004-52705 | 6/2004 |

\* cited by examiner

*Primary Examiner* — Phillip H Nguyen
(74) *Attorney, Agent, or Firm* — Jefferson IP Law, LLP

(57) ABSTRACT

A portable storage device, a system, and a method for an automatic software installation, the portable storage device including: an interface to connect to an external device to transmit and/or to receive data to/from the external device; a memory to store a setup program to install, in the external device, a main software required to connect the portable storage device to the external device; and a controller to control the interface to transmit the setup program to the external device when the interface is connected to the external device, wherein the setup program is transmitted to the external device and automatically run in the external device. Accordingly, when the portable storage device is connected to the external device, the software can be automatically installed by auto-running the setup program internally stored to the portable storage device.

19 Claims, 4 Drawing Sheets

PORTABLE STORAGE DEVICE, SYSTEM AND METHOD FOR AUTOMATIC SOFTWARE INSTALLATION

CROSS-REFERENCE TO RELATED APPLICATION

This application claims the benefit of Korean Application No. 2006-133084, filed on Dec. 22, 2006, in the Korean Intellectual Property Office, the disclosure of which is incorporated herein by reference.

BACKGROUND OF THE INVENTION

1. Field of the Invention

Aspects of the present invention relate to a portable storage device, a system, and a method for an automatic software installation, and more particularly, to a portable storage device to automatically install a software by automatically executing a setup program stored in the portable storage device when the portable storage device is connected to an external device, and a system and a method for an automatic software installation.

2. Description of the Related Art

As a wider variety of peripheral devices to connect to computers become available, the number of available ports to connect to the peripheral devices becomes limited. To address this limitation, universal serial bus (USB) type connections between the peripherals and the computer has been suggested.

With the advance of digital devices, more types of portable USB storage devices (such as an MPEG Audio Layer-3 (MP3) player, a portable multimedia player (PMP), a portable video game player, etc.) are emerging. However, to connect the portable storage device to the computer, it is necessary to install software to be executed in the computer. Thus, manufacturers of the portable storage device sell a separate CD-ROM together with the portable storage device. Only after installing the CD-ROM to the computer or downloading and installing the software from an Internet server where the software is uploaded, users can use the portable storage device connected to the computer.

To connect the portable storage device to the computer, the user is inconvenienced due to too many procedures. Furthermore, if the user loses the CD-ROM or uses the portable storage device in a new computer, the software must be installed again, resulting in more inconvenience and a waste of time for the user.

When the portable storage device is connected to the computer through a USB port, the computer detects the connection, automatically searches the portable storage device, and generates, for example, a "portable disk" drive. However, even when the portable storage device is found as the portable disk, there is a limitation in automatically executing a program stored in the portable storage device. Compared to the automatic software installation by an auto-run program using the CD-ROM, such a shortcoming imposes a limitation when substituting the CD-ROM with the portable storage device storing the software therein.

SUMMARY OF THE INVENTION

Aspects of the present invention relate to a portable storage device that internally stores a setup program to install, in an external device, a software required to enable a connection between the portable storage device and the external device, automatically executes the setup program when the portable storage device is connected to the external device, and automatically installs the software, and an automatic software installation system and method of the portable storage device.

According to an aspect of the present invention, there is provided a portable storage device including: an interface to connect to an external device to transmit and/or to receive data to/from the external device; a memory to store a setup program to install, in the external device, a main software required to enable a connection between the portable storage device and the external device; and a controller to control the interface to transmit the setup program to the external device when the interface is connected to the external device, wherein the setup program is transmitted to the external device and automatically run in the external device.

The main software may be stored in the memory.

The controller may control the interface to transmit the main software stored in the memory to the external device when it is determined that the main software is not installed in the external device.

The controller may delete the main software from the memory when the main software is installed in the external device.

The setup program may download the software from a network to which the external device is connected and install the downloaded software when the memory of the portable storage device does not store the main software.

The setup program may download a portion of the main software from the network to which the external device is connected and install the downloaded portion of the main software when the portion of the main software is not stored in the memory of the portable storage device.

The external device may be a computer.

The memory may comprise a read only memory (ROM) to store the setup program.

According to another aspect of the present invention, there is provided an automatic software installation system including: an external device; and a portable storage device to store a setup program to install in the external device a main software required to enable a connect between the portable storage device and the external device, and to transmit the setup program to the external device when the portable storage device is connected to the external device, wherein the setup program is transmitted to the external device and automatically run.

The automatic software installation system may further include a server that is connected to the external device over a network and transmits the main software to the external device according to a request from the external device.

According to another aspect of the present invention, there is provided an automatic software installation method including: determining whether a portable storage device is connected to an external device; transmitting, from the portable storage device to the external device, a setup program to install a main software required to enable a connection between the portable storage device and the external device when the portable storage device is connected to the external device; and automatically running the transmitted setup program.

According to yet another aspect of the present invention, there is provided an automatic software installation system including: an external device; a portable storage device to store a setup program to install, in the external device, a main software required to enable a connection between the portable storage device and the external device, and to transmit the setup program to the external device when the portable storage device is connected to the external device; and a server that is connected to the external device over a network and transmits at least a portion of the main software to the external device when the setup program is run in the external device, wherein the setup program is transmitted to the external device and automatically run in the external device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
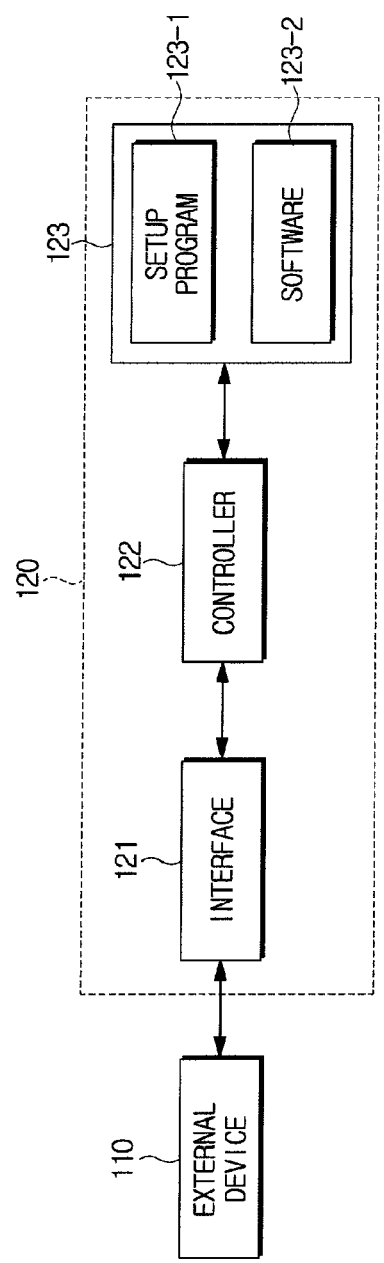
FIG. 1 is a simplified diagram of a portable storage device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a simplified diagram of a portable storage device 120 connected to an external device 110. Referring to FIG. 1, the portable storage device 120 includes an interface 121, a controller 122, and a memory 123. The memory 123 stores data and a setup program 123-1 to install a software 123-2 that is required to connect the portable storage device 120 to the external device 110. The memory 123 storing the setup program 123-1 can be a read only memory (ROM). The setup program 123-1 includes an auto-run program.

The interface 121 is connected to the external device 110 to transmit and receive data to/from the external device 110. When the interface 121 is connected to the external device 110, the controller 122 controls the interface 121 to transmit the setup program 123-1 to the external device 110. The external device 110 may be any device communicable with the portable storage device (such as a computer). The external device 110 is provided with a user interface (not shown) to input a user's selection command. The portable storage device may be any device communicable with the external device 110 through the USB port (such as an MP3 player, a PMP, and a portable video game player). When the portable storage device 120 is connected to the external device 110, the setup program 123-1 is transmitted to the external device 110 and then auto-run.

The memory 123 may store software 123-2 required for the connection of the portable storage device 120 to the external device 123, in addition to the setup program 123-1. However, it is understood that the setup program 123-1 may be the only software included in the memory 123. Furthermore, the software 123-2 may, although not necessarily, include a main program requisite for the connection of the portable storage device 120 to the external device 110 and an optional program (such as a moving picture edition, a quality adjustment, etc.). An optional program of large capacity is selectively stored in the memory 123 of the portable storage device 120.

The controller 122 of the portable storage device 120 controls the interface 121 to transmit the entire software program or the main program to the external device 110 depending on whether the software 123-2 is stored in the memory 123.

When the setup program 123-1 transmitted to the external device 100 by the controller 122 of the portable storage device 120, the setup program 123-1 executes automatically (auto-run) in the external device 100. Once the installation of the software 123-2 of the memory 123 is completed, the controller 122 may delete the software 123-2 from the memory 123. The deletion is to reduce the storage space occupied by the software 123-2 in the portable storage device 120. However, it is understood that according to other aspects, the software 123-2 remains in the memory 123 after the installation. Furthermore, according to other aspects, when the software 123-2 finishes installing in the external device 100, the user may be able to choose to delete the software 123-2 from the portable storage device 120 or to delete part of the program (such as an optional program). The setup program 123-1 may provide the user with these options.

As the setup program 123-1 is executed, when it is determined that the memory 123 of the portable storage device 120 does not store the software 123-2, the software 123-2 can be downloaded over a network (not shown) connected to the external device 110. Specifically, the setup program 123-1 determines whether the external device 110 is connected to the network (not shown). When the external device 110 is connected to the network (not shown), the software 123-2 is downloaded and installed in the external device 110. When only the main program is stored to the memory 123 of the portable storage device 120, optional programs can be downloaded and installed. Furthermore, additional optional programs, updates to the main program, or updates to the optional programs may be downloaded and installed in the external device. By contrast, when the external device 110 is not connected to the network (not shown) and the main program is not included in the memory, the setup program 123-1 terminates the software installation and may inform the user of the reason for termination.

Figure 2:
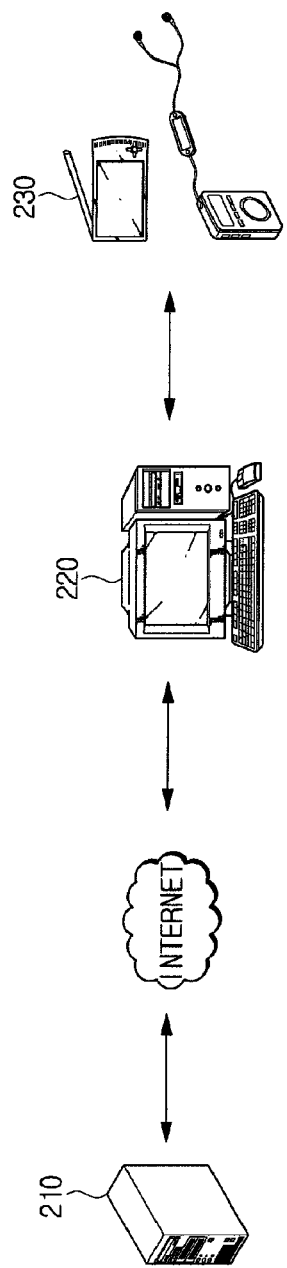
FIG. 2 is a simplified diagram of an automatic software installation system according to an embodiment of the present invention.

FIG. 2 is a simplified diagram of an automatic software installation system according to an embodiment of the present invention. The automatic software installation system includes an external device 220 and a portable storage device 230. The portable storage device 230 stores a setup program (123-1 in FIG. 1). When the portable storage device 230 is connected to the external device 220, the setup program is transmitted to the external device 220 and then auto-run. The functions and structures of the external device 220, the portable storage device 230, and the setup program are the same as explained in FIG. 1 and thus shall not be described further in detail.

In addition to the external device 220 and the portable storage device 230, the automatic software installation system can further include a server 210 connected to the external 220 over a network. The network may be the Internet, and the server 210 may be an Internet server connected to the external device 220 over the Internet. The server 210 stores the software required to connect the portable storage device 230 to the external device 220. Thus, the setup program 123-1 auto-run in the external device 220 downloads any necessary programs from the server 210 and installs the programs. For instance, when the software is not stored to the portable storage device 230, the software is automatically downloaded from the server 210 and then auto-run in the external device 220. As described with reference to FIG. 1, the setup program 123-1 can determine whether the external device 220 is connected to the server 210, and inform the user of the software installation when the external device 220 is not connected to the server 210 and/or the software downloading is not possible. It is further understood that according to other aspects, optional programs and/or updates to any of the software may be downloaded from the server 210. Also, when part of the software programs is not stored to the portable storage device 220, the setup program can download and install only the partial program from the server 210.

Figure 3:
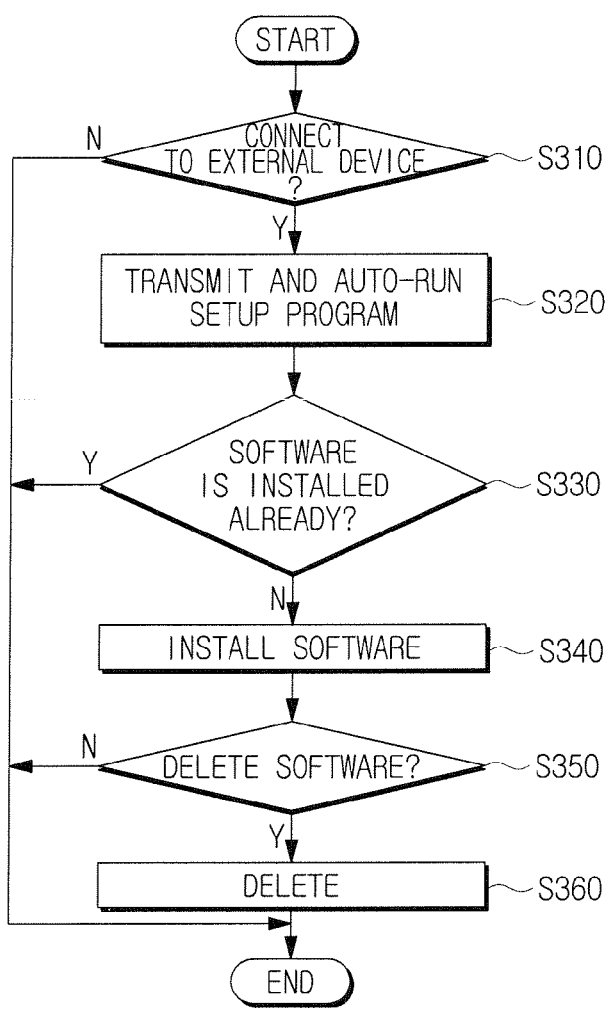
FIG. 3 is a flowchart of an automatic software installation method according to an embodiment of the present invention.

FIG. 3 is a flowchart of an automatic software installation method according to an embodiment of the present invention. First, it is determined whether the portable storage device is connected to the external device (operation S310). For example, the controller of the external device determines whether the portable storage device is connected to the external device, and transmits the determination information to the portable storage device. If the portable device is not connected to the external device (operation S310), the automatic software installation is terminated. If the portable storage device is connected to the external device (operation S310), the controller of the portable storage device controls the interface of the portable device to transmit to the external device the setup program to install the software required to connect the portable storage device to the external device. Accordingly, the setup program is transmitted to the external device and then automatically run (operation S320).

Next, the auto-run setup program determines whether the software is already installed in the external device (operation S330). When the software is already installed (operation S330), the automatic software installation is terminated. When the software is not installed in the external device (operation S330), the software may be received from the portable storage device and installed in the external device (operation S340). Even when the software is not installed in the external device yet, the automatic software installation method may further include providing a user an option on whether to install the software to the external device or not. Accordingly, when the user does not want to install the software, the software installation is terminated. The software installation (operation S340) will be described in more detail with reference to FIG. 4.

Upon completion of the software installation (operation S340), the setup program may ask the user whether the user wants to delete the software from the portable device (operation S350). This is to reduce the storage space occupied by the software in the portable storage device. When the user selects to delete the software, the software is deleted from the portable storage device (operation S360). The software deletion (S360) will be further explained with reference to FIG. 5.

Figure 4:
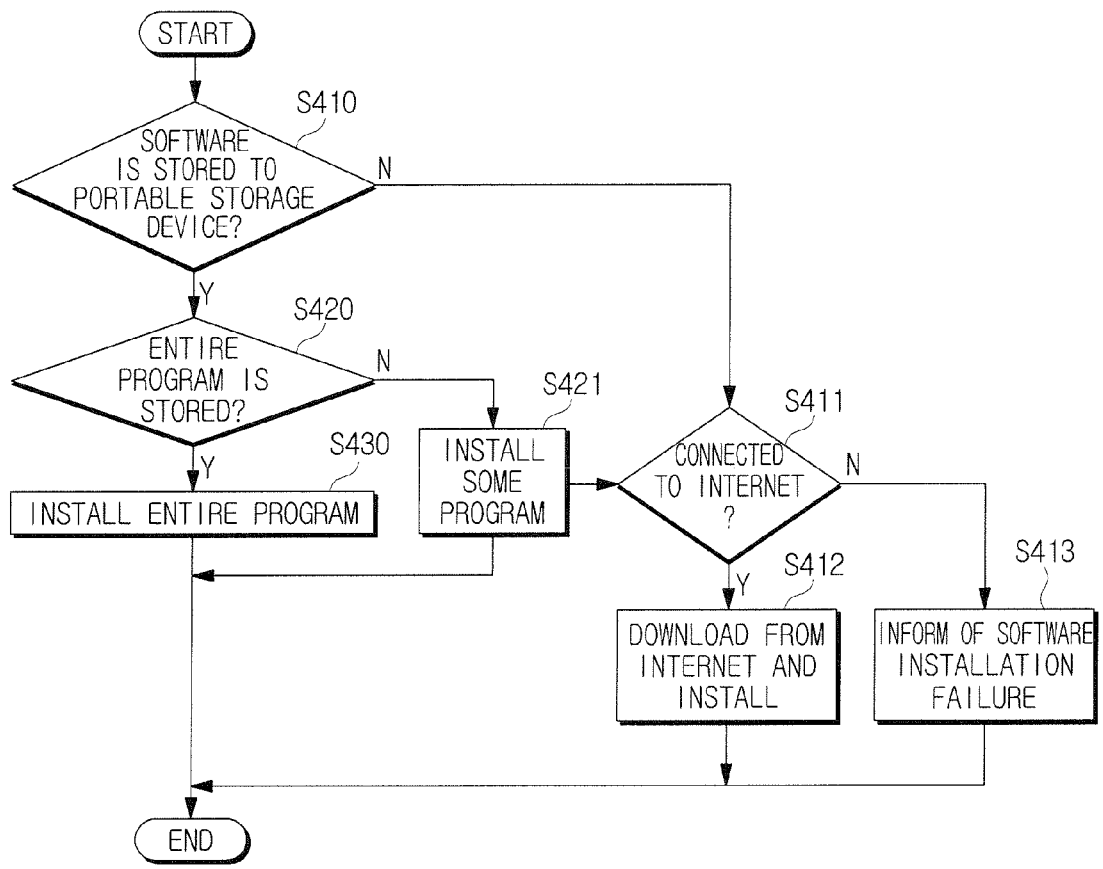
FIG. 4 is a detailed flowchart of the automatic software installation method according to an embodiment of the present invention.

FIG. 4 is a flowchart explaining the software installation by the setup program (operation S340 in FIG. 3). The setup program determines whether the software (123-2 in FIG. 1) is stored in the portable storage device (operation S410). When the software is stored in the portable storage device (operation S410), the setup program determines whether the entire software program is stored in the portable storage device (operation S420). When the entire software program is stored in the portable storage device (operation S420), the entire program is installed in the external device (operation S430).

When the software is not stored in the portable storage device (operation S410), the setup program determines whether the external device is connected to a network (operation S411). The network may be the Internet. When the external device is connected to the network (operation S411), the software is downloaded from the network and installed in the external device (operation S412). In contrast, when the external device is disconnected from the network (operation S411), the setup program informs the user of the software installation failure (operation S413) and terminates the installation.

When only part of the software programs is stored in the portable electronic device (operation S420), the partial program is installed in the external device (operation S421). After the installation of the partial program, it is automatically determined whether the external device is connected to a network (operation S411). When the external device is connected to the network, the remaining program or programs can be downloaded from the network (such as the Internet) and installed. It is understood that the user may be provided the option to install the remaining program, any optional programs, and/or any updates to the software. When the user does not want to install the remaining program, only the partial program stored in the portable storage device (i.e., only the main program required for the connection) is installed and the software installation is terminated.

Figure 5:
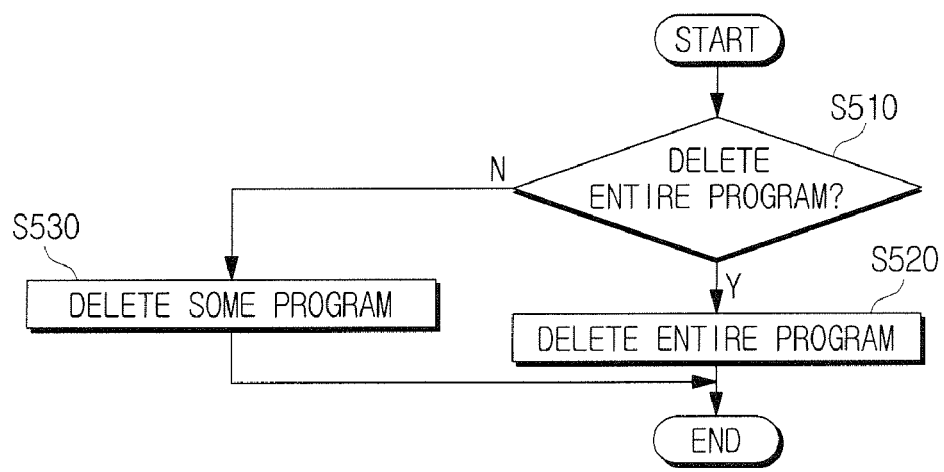
FIG. 5 is a detailed flowchart of a software deletion method according to an embodiment of the present invention.

FIG. 5 is a detailed flowchart of the software deletion from the portable storage device after the software installation to the external device according to an embodiment of the present invention. The setup program can ask the user if the user wants to delete the entire program from the portable storage device (operation S510). When the user wants to delete the entire program from the portable storage device (operation S510), the entire program is deleted (operation S520). When the user does not want to delete the entire program (operation S510), part of the program or programs may be deleted (operation S530) and the process is terminated.

It is noted that the user can input such a selection command through the user interface of the external device.

In the portable storage device and the automatic software installation system and method according to aspects of the present invention, the setup program to install the software required to connect the portable storage device to the external device is internally stored in the portable storage device. Thus, upon the connection of the portable storage device to the external device, the setup program is auto-run and the software is automatically installed. Once the portable storage device is connected to the external device, the software is automatically installed. Therefore, a user is less inconvenienced in the software installation as compared to using a CD-ROM to install the software. Even if the CD-ROM is lost or the software reinstallation is needed, the software stored in the portable storage device can be used. Therefore, the user's convenience can be enhanced and the manufacturer can lower the cost required to manufacture a separate software CD-ROM merely by manufacturing and selling the portable storage device containing the software.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable storage device, the device comprising:
   an interface to connect to an external device to transmit and/or to receive data to/from the external device;
   a memory to store a setup program to install, in the external device, a main software required to enable a communication between the portable storage device and the external device; and
   a controller to control the interface to transmit the setup program to the external device when the interface is connected to the external device, wherein the setup program is transmitted to the external device and automatically run in the external device, and to control the interface to transmit the main software to the external device.

2. The portable storage device as claimed in claim 1, wherein the main software is stored in the memory.

3. The portable storage device as claimed in claim 2, wherein the controller controls the interface to not transmit the main software to the external device when the main software is already installed in the external device.

4. The portable storage device as claimed in claim 2, wherein the controller deletes the main software from the memory after the software is installed in the external device.

5. The portable storage device as claimed in claim 1, wherein the setup program downloads the main software from a network to which the external device is connected and installs the downloaded main software in the external device.

6. The portable storage device as claimed in claim 5, wherein the setup program does not download the main software from the network when the memory of the portable storage device stores the main software.

7. The portable storage device as claimed in claim 1, wherein the setup program downloads a portion of the main software from a network to which the external device is connected and installs the downloaded portion of the main software when the portion of the main software is not stored in the memory.

8. The portable storage device as claimed in claim 1, wherein the external device is a computer.

9. The portable storage device as claimed in claim 1, wherein the memory comprises a Read Only Memory (ROM) to store the setup program.

10. An automatic software installation system, the system comprising:
    an external device; and
    a portable storage device comprising a memory to store a setup program to install, in the external device, a main software required to enable a communication between the portable storage device and the external device, and an interface and a controller to transmit the setup program to the external device when the portable storage device is connected to the external device, wherein the setup program is transmitted to the external device and automatically run in the external device, and to control the interface to transmit the main software to the external device.

11. The automatic software installation system as claimed in claim 10, further comprising:
    a server that is connected to the external device over a network and transmits the main software to the external device when the setup program is run in the external device if the main software is stored on the server.

12. An automatic software installation method, the method comprising:
    determining whether a portable storage device is connected to an external device;
    controlling an interface between the portable storage device and the external device;
    transmitting, by the portable storage device to the external device, a setup program to install a main software required to enable a communication between the portable storage device and the external device when it is determined that the portable storage device is connected to the external device;
    transmitting the main software from the portable storage device to the external device to be installed in the external device; and
    automatically running the transmitted setup program in the external device.

13. The automatic software installation method as claimed in claim 12, further comprising:
    determining whether the main software is stored in the portable storage device when the main software is not already installed in the external device.

14. The automatic software installation method as claimed in claim 13, further comprising:
    deleting the main software from the portable storage device when the main software completely installs in the external device.

15. The automatic software installation method as claimed in claim 13, further comprising:
    downloading the main software from a network to which the external device is connected and installing the main software in the external device when the main software is not stored in the portable storage device.

16. The automatic software installation method as claimed in claim 13, further comprising:
    downloading a portion of the main software from a network to which the external device is connected and installing the portion of the main software in the external device when the portion of the main software is not stored in the portable storage device.

17. The automatic software installation method as claimed in claim 12, wherein the external device is a computer.

18. The automatic software installation method as claimed in claim 12, wherein the portable storage device comprises a Read Only Memory (ROM) to store the setup program.

19. The automatic software installation method as claimed in claim 12, further comprising:
    transmitting optional software and/or additional software, different from the main software, from the portable storage device to the external device.

* * * * *